Oct. 8, 1940.    H. W. GREENUP    2,217,606

CELLULAR RUBBER AND METHOD OF MAKING THE SAME

Filed Nov. 20, 1935

INVENTOR
Harold W. Greenup
BY Albert L. Ely
ATTORNEY

Patented Oct. 8, 1940

2,217,606

UNITED STATES PATENT OFFICE 2,217,606

CELLULAR RUBBER AND METHOD OF MAKING THE SAME

Harold W. Greenup, Akron, Ohio, assignor to The Firestone Tire & Rubber Company, Akron, Ohio, a corporation of Ohio Application November 20, 1935, Serial No. 50,791

5 Claims. (Cl. 260—723)

This invention relates to cellular rubber composition and to methods of making the same, and more especially it relates to cellular macroporous sponge rubber structures made from an aqueous dispersion of rubber and to improved procedure for manufacturing it.

Numerous processes have been proposed heretofore for producing cellular rubber of the character mentioned. Thus in U. S. Patent No. 1,156,184 to Schidrowitz et al. there is disclosed a method which comprises treating rubber latex with an acid or other coagulant and with a gas producing substance or "blowing" agent. In Patent No. 1,777,945 to Untiedt the invention comprises adding soap or other similar foam-stabilizing agent to rubber latex and then whipping the compound to a froth and thereafter drying. In Patent No. 1,852,447 to Chapman et al. the invention comprises adding a froth-forming substance such as soap, and a gelling agent to latex, whipping to a froth and then gelling the froth. It will be observed that all the foregoing processes employ some sort of a frothing or blowing agent, which, of course, is present in the finished product, and subsequently must be removed therefrom if the finished product is to be used in certain situations, such as in surgical work. In Patent No. 1,745,657 to Beckmann the invention comprises forming latex into an elastic jelly by the addition of soluble salts of the alkaline earths or other dyad metals, but results in a microporous product as distinguished from the macroporous or cellular sponge rubber structure of the present invention.

The chief objects of the invention are to provide an improved and more facile and economical method of producing vulcanized cellular rubber direct from aqueous dispersed rubber; and to produce a purer cellular rubber product than heretofore has been achieved. More specifically the invention aims to produce cellular rubber from an aqueous dispersion of rubber without the employment of a frothing agent. Other objects will be manifest.

Figure 1:
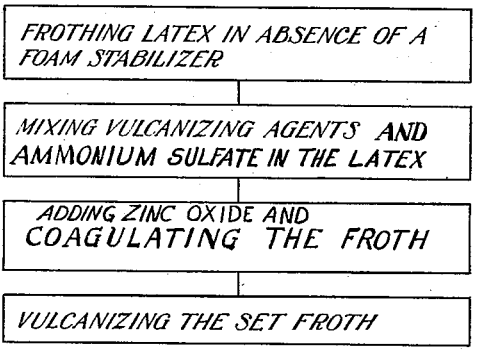
Figure 2:
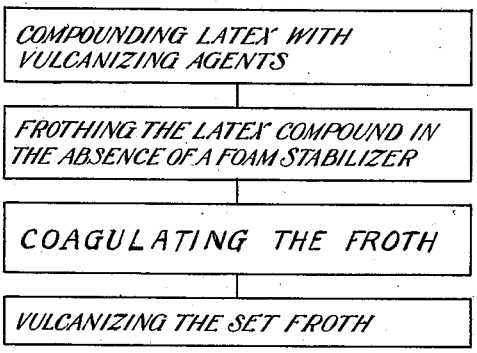
Figure 3:
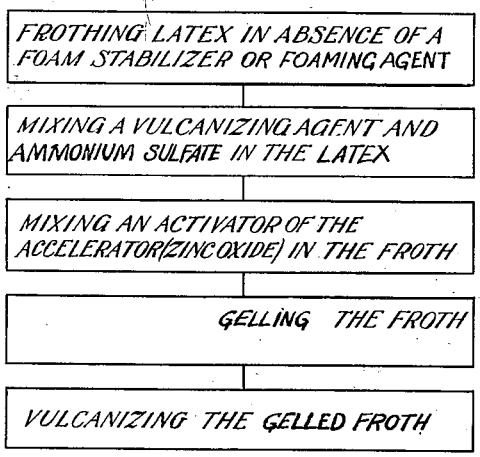
Figure 4:
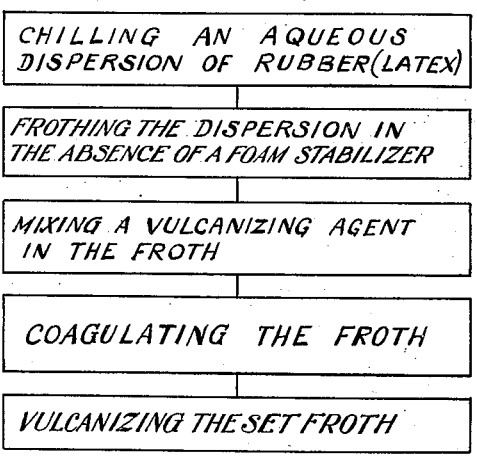
Figure 5:
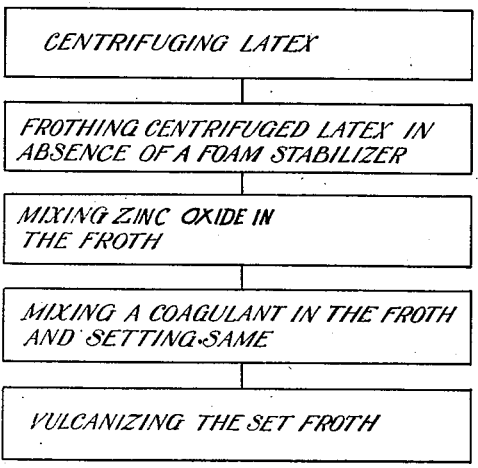
Figure 6:
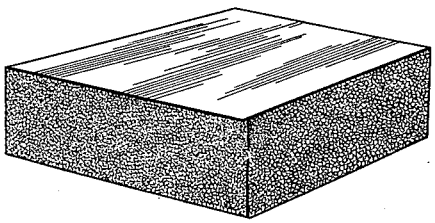

Figures 1 to 5 of the drawing are flow diagrams of specific examples of processes employing the principles of the method of the invention; and Figure 6 is a perspective view of a piece of cellular or macroporous sponge rubber embodying the invention as an article of manufacture.

In this invention the addition of any froth-forming agent to the aqueous dispersion of rubber is dispensed with. Suitable vulcanizing ingredients, namely, an accelerator and sulfur may be added before frothing if desired, although this is not necessary. While the invention contemplates the use of aqueous dispersions of rubber generally, the best results have been obtained by the use of concentrated rubber latex, such as centrifuged latex. The accelerator employed may be of the "ultra-accelerator" class and may, for example, be composed of the combination of piperidine pentamethylene dithiocarbamate (commercially known as "Pip-Pip") and 2-mercapto-benzo-thiazole although other suitable accelerators may be employed. Another example of a suitable accelerator is butyl zimate. The frothing of the latex is effected in any known or desired manner as by aerating, whipping or beating.

After the composition has been reduced to a froth, there are added the vulcanizing ingredients (if not previously added), an activator of the accelerator, for example, zinc oxide, and a coagulant or gelling agent which may be added immediately preceding, with, or immediately after the activator. The coagulant is of the delayed-action type, as an example of which ammonium sulfate has been found to be satisfactory, but other delayed-action coagulants may be used if desired, such as ammonium nitrate. The whipping of the latex may be continued for a brief interval or resumed if it has been stopped, to assure uniform distribution of the several ingredients therein. The gelling agent employed produces coagulation in about thirty minutes at room temperature and converts the latex composing the froth into an irreversible gel. The gelled froth is vulcanized at a temperature preferably not above that of boiling water, and thereafter is dried. If preferred the gelling and curing operations may be combined into a continuous process.

The following examples have been found to produce a satisfactory product:

Example I

| | Grams |
|---|---|
| 60 per cent concentrated latex | 166 |
| 50 per cent sulfur suspension in water | 5 |
| 10 per cent 2-mercapto-benzo-thiazole (dissolved in 1% ammonia solution) | 5 |
| Piperidine-pentamethylene-dithiocarbamate | .5 |

The foregoing mixture is beaten to a froth, after which 5 grams of 40% zinc oxide suspension and 4 grams of 40% ammonium sulfate solution are added and stirred in. The foam is then poured into suitable molds, and after the lapse of a sufficient interval to permit it to coagulate or gel, is vulcanized forty-five minutes in boiling water. The vulcanized product is dried. If preferred the gellation may be hastened by treating at temperatures up to 100° C. or the gelling and vulcanizing process may be made continuous.

Example II

Concentrated latex is chilled to about 32° F. and then is frothed, compounded and subsequently vulcanized in the manner set forth under Example I. The chilling increases the viscosity of the latex and makes it possible to reduce it to a froth in a briefer interval of time.

Example III

| | Grams |
|---|---|
| 60 per cent centrifuged latex | 166 |
| 50 per cent sulfur suspension | 2 |
| 40 per cent zinc oxide suspension | 5 |
| Butyl zimate | 1 |
| Ammonium nitrate | .8 |
| Water | 1.2 |

The latex is beaten into a froth and the other ingredients added, the zinc oxide suspension being added last. The froth is stirred to obtain uniform distribution of the added ingredients, and poured into a mold. The mold is then immersed in boiling water for thirty minutes to effect gellation and cure. The sponge rubber obtained is then dried.

An important feature of the invention is the addition of the zinc oxide or other activator of the accelerator after the frothing of the latex. This permits the formation of a stable froth without the addition of a foaming agent. Among other disadvantages, the use of a soap or other foaming agent, as heretofore employed, requires the addition of larger amounts of gelling agent than used in the present process. The term "frothing" as employed in the appended claims is intended to include the forming of a foam by aeration, whipping or beating as distinguished from the formation of a foam by the use of a chemical "blowing agent".

The invention produces a pure, high-grade cellular rubber of uniform cell-size, and achieves the other objects set out in the foregoing statement of objects.

Other modification may be resorted to without departing from the spirit of the invention or the scope of the appended claims.

What is claimed is:

1. The process of manufacturing a macroporous or cellular rubber body from an aqueous dispersion of rubber comprising the steps of frothing the rubber dispersion in the absence of an added frothing or foam stabilizing agent, adding a vulcanizing agent and ammonium sulphate to the dispersion, adding zinc oxide to the froth, gelling the froth, and vulcanizing the gelled froth.

2. The process of manufacturing a macroporous or cellular rubber body from an aqueous dispersion of rubber comprising the steps of frothing the rubber dispersion in the absence of an added frothing or foam stabilizing agent, adding a vulcanizing agent and ammonium sulphate to the dispersion, adding a vulcanization activator to the froth, gelling the froth, and vulcanizing the gelled froth.

3. A method of making macroporous or cellular rubber which comprises chilling an aqueous dispersion of rubber, frothing said dispersion without the addition of a foam stabilizing agent, and coagulating the froth to set it to an irreversible gel, a vulcanizing ingredient being present in the froth.

4. A method of making macroporous or cellular rubber which comprises frothing latex which has been concentrated by centrifuging, said frothing step being effected in the absence of an added foam stabilizing agent, and adding a coagulant and zinc oxide to the froth for coagulating the froth to set it to an irreversible gel, a vulcanizing ingredient being present in the froth.

5. An article of manufacture produced in accordance with the method of claim 4.

HAROLD W. GREENUP.